United States Patent [19]
Erb

[11] 4,271,823
[45] Jun. 9, 1981

[54] UNITARY SOLAR COLLECTOR PANEL

[75] Inventor: Robert A. Erb, Valley Forge, Pa.

[73] Assignee: The Franklin Institute, Philadelphia, Pa.

[21] Appl. No.: 930,798

[22] Filed: Aug. 3, 1978

Related U.S. Application Data

[63] Continuation-in-part of Ser. No. 645,648, Dec. 31, 1975, Pat. No. 4,114,597.

[51] Int. Cl.³ .............................................. F24J 3/02
[52] U.S. Cl. .................................... 126/445; 126/441; 126/448; 126/449
[58] Field of Search ................. 126/417, 432, 442–450

[56] References Cited

U.S. PATENT DOCUMENTS

| 3,239,000 | 3/1966 | Meagher | 126/448 |
|---|---|---|---|
| 3,981,294 | 9/1976 | Deminet et al. | 126/445 |
| 4,018,211 | 4/1977 | Barr | 126/439 |
| 4,062,352 | 12/1977 | Lesk | 126/445 |
| 4,078,548 | 3/1978 | Kapany | 126/441 |
| 4,114,597 | 9/1978 | Erb | 126/901 |
| 4,178,914 | 12/1979 | Erb | 126/449 |

FOREIGN PATENT DOCUMENTS

2516525  10/1976  Fed. Rep. of Germany ........... 126/448

*Primary Examiner*—James C. Yeung
*Attorney, Agent, or Firm*—Weiser, Stapler & Spivak

[57] ABSTRACT

An improved unitary, coextruded solar collector panel of the type having an upper, heat insulating region, and a lower, heat absorbing region, each region having ribs which separate the region into channels, for the passage of a fluid therethrough, wherein the heat insulating region is provided with an increased number of channels, to decrease radiation and convection losses from the heat insulating region, and the heat absorbing region is provided with oblique ribs which form channels of increased cross sectional area, to improve heat transfer from the heat absorbing region to the fluid circulated therein. Bowing of the unitary collector panel out of its planar configuration is reduced by providing a heat absorbing region which is darkened in a manner such that the heat density is greatest at a point away from the bottom of the collector panel.

40 Claims, 8 Drawing Figures

UNITARY SOLAR COLLECTOR PANEL

This application is a continuation-in-part of my copending application, Ser. No. 645,648, filed Dec. 31, 1975, U.S. Pat. No. 4,114,597.

BACKGROUND OF THE INVENTION

This invention relates generally to the field of solar energy collection systems and in particular to an improved unitary coextruded solar collector panel of the type having an upper, heat insulating region, and a lower, heat absorbing region.

Recent realizations that alternative energy sources to fossil fuels must be developed have caused substantial efforts to be made in developing a commercially acceptable solar energy collection system. An essential component of any solar energy collection system being the solar collector panel, a substantial amount of effort has been expended in the development of this element of the system.

Initial efforts to develop a useful solar collector panel often resulted in heavy, cumbersome structures involving the use of several, often incompatible, construction materials. This problem was particularly acute in the design of an acceptable flat plate type solar collector panel.

The flat plate type collector panel is generally more compatible with large structures, such as homes or offices, lending themselves well to the solar heating of air or water for use in the home or office, of water for distillation purposes, and even of water for use in heating a swimming pool. This compatibility results from the existence on all buildings of large flat areas, such as the roof or walls, upon which such flat plate type collector panels may be mounted.

Although well suited for use in connection with a building, flat plate type collector panels had not yet found wide commercial acceptance for various reasons. Moreover, the cost of producing an efficient and workable collector panel often far outweighed its return, seriously limiting acceptance of such collectors by the public.

My patent application, Ser. No. 645,648 now U.S. Pat. No. 4,114,597, which is hereby incorporated by reference herein, discloses a flat plate type solar collector panel which serves to eliminate the above-mentioned drawbacks thus enabling production of a commercially acceptable solar thermal energy collection system. This is accomplished by providing a solar collector panel which is unitary in construction and which is capable of being produced in long, lightweight and continuous sections. In this manner entire portions of a structure may be covered with a series of such panels thereby enabling the conversion of sufficient amounts of solar thermal energy to provide for the heating needs of a consumer.

The unitary collector panels disclosed are produced by coextruding a selected combination of synthetic thermoplastics into long panels having heat insulating and heat absorbing layers along their entire length. In this manner the previously required combination of construction materials is replaced by a single unit requiring no individual construction or separate parts. The resulting units are lightweight which permits easy installation and also permits large surface areas to be completely utilized without requiring substantial shoring of the underlying structural members. The unit is also capable of being produced in large sizes and quantities, decreasing both the cost of such units as well as the costs of installation and labor.

Although the unitary solar collector panels above described are well suited to solving the problems presented in converting solar energy into heat, it has been found that certain aspects of those collector panels are capable of improvement, further enhancing the utility and potential for public acceptance of the resulting solar energy collection system.

One such aspect concerns the particular nature and configuration of the ribs used to separate the heat insulating region and the heat absorbing region into channels through which a fluid may be uniformly maintained or circulated.

For example, it has been found that unitary collector panels exhibit a certain degree of radiation and convection losses from the heat insulating region. These losses can be reduced by suitably modifying the ribs used to form the channels of that region.

Also, the heat absorbing region of such collector panels is capable of certain improvements. Modifications to the ribs which form that region can enhance heat conduction from the heat absorbing region to the fluid circulated therethrough, and can reduce the bowing of collector panels out of their planar configuration, which has been encountered in certain environments.

SUMMARY OF THE INVENTION

This invention relates generally to the field of solar energy collection systems, and in particular to an improved unitary, coextruded solar collector panel of the type having an upper, heat insulating region, and a lower, heat absorbing region, each region having ribs which separate both regions into channels, wherein the ribs are adapted to reduce radiation and convection losses from the heat insulating region, to increase conductive heat transfer to a fluid circulating through the heat absorbing region, and to reduce the bowing encountered when such solar collector panels are exposed to certain environments.

In order to convert radiation from the sun into useful thermal solar energy, a building structure is provided with a plurality of coextruded unitary solar collector panels. First, the panels are affixed to the building using a plurality of battens particularly suited for such purpose. Next the collector panels are joined at each end by headers which are then connected to a circulating system capable of directing the converted solar energy produced toward a useful purpose.

In accordance with the present invention, the ribs which separate the heat insulating region into a plurality of channels, capable of retaining therein an insulating fluid, are proportioned so as to reduce the width and/or cross sectional area of the heat insulating channels. In this manner, convection currents within the channels are reduced by frictional damping, thereby reducing convection losses.

Several alternative embodiments are capable of providing such a result. For example, the width of the channels may be reduced by providing the collector panel with an increased number of ribs, and therefore, channels. It is also possible to employ oblique ribs, thereby creating triangular channels having relatively small cross sectional areas. Combinations of these configurations are also possible.

Further, in accordance with the present invention, the ribs which separate the heat absorbing region into a plurality of channels capable of passing a fluid therethrough, for heating of the fluid, are obliquely oriented and are proportioned to increase fluid flow through the channels of the heat absorbing region, thereby increasing heat transfer to that fluid, and the remainder of the system.

This is accomplished by providing the heat absorbing region with oblique ribs, the upper end of which are separated from the upper wall of the heat absorbing region by a linear portion which is connected between the oblique ribs and the upper wall. In this manner, the cross sectional area of one group of channels of the heat absorbing region is increased relative to the cross sectional area of the remaining group of channels. By so doing, the flow in the larger group of channels is matched to the flow through the smaller group of channels, in a manner to be more fully described below, which improves, and thus increases, fluid flow through the heat absorbing region.

Also, in accordance with the present invention, the ribs of the heat absorbing region are darkened in a manner which places the point of greatest heat density away from the base of the collector panel, thereby reducing the potential for bowing of the collector panels out of their planar configuration as previously encountered in certain environments. By appropriately darkening the ribs, rather than the bottom of the collector panel, the point of greatest heat density is moved away from the bottom of the collector panel, which reduces the expansion differential between the clear and dark portions of the collector panel, thereby reducing the bowing which would result from such a differential.

It is therefore an object of the present invention to provide an improved unitary solar collector panel of increased efficiency.

It is another object of the present invention to provide an improved unitary solar collector panel wherein heat losses, due to radiation and convection, from the heat insulating region of the collector panel are reduced.

It is another object of the present invention to provide an improved unitary solar collector panel wherein the heat insulating region of the collector panel has ribs which are adapted to reduce convection through the heat insulating region.

It is another object of the present invention to provide an improved unitary solar collector panel wherein the heat insulating region is provided with an increased number of channels to thereby reduce convection through the heat insulating region and the convective heat losses which would result.

It is another object of the present invention to provide an improved unitary solar collector panel wherein heat conduction from the heat absorbing region to the fluid circulated therethrough is increased.

It is another object of the present invention to provide an improved unitary solar collector panel wherein the heat absorbing region of the collector panel has ribs which are adapted to increase flow of the conducting fluid through the heat absorbing region.

It is another object of the present invention to provide an improved unitary solar collector panel wherein the heat absorbing region has channels of increased cross sectional area to thereby increase fluid flow through portions of the heat absorbing region.

It is another object of the present invention to provide an improved unitary solar collector panel which resists bowing of the collector panel out of its normally planar configuration when it is subjected to varying temperature excursions during use.

It is another object of the present invention to provide an improved unitary solar collector panel which has a heat absorbing region, the heat density of which is greatest at a point away from the bottom of the collector panel, to thereby reduce bowing of the collector panel out of its normally planar configuration.

These objects and others will become apparent to those skilled in the art from the following disclosure of the preferred embodiment of the invention taken in conjunction with the drawings provided in which like reference characters refer to similar parts throughout the several views provided, in which:

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Figure 1:
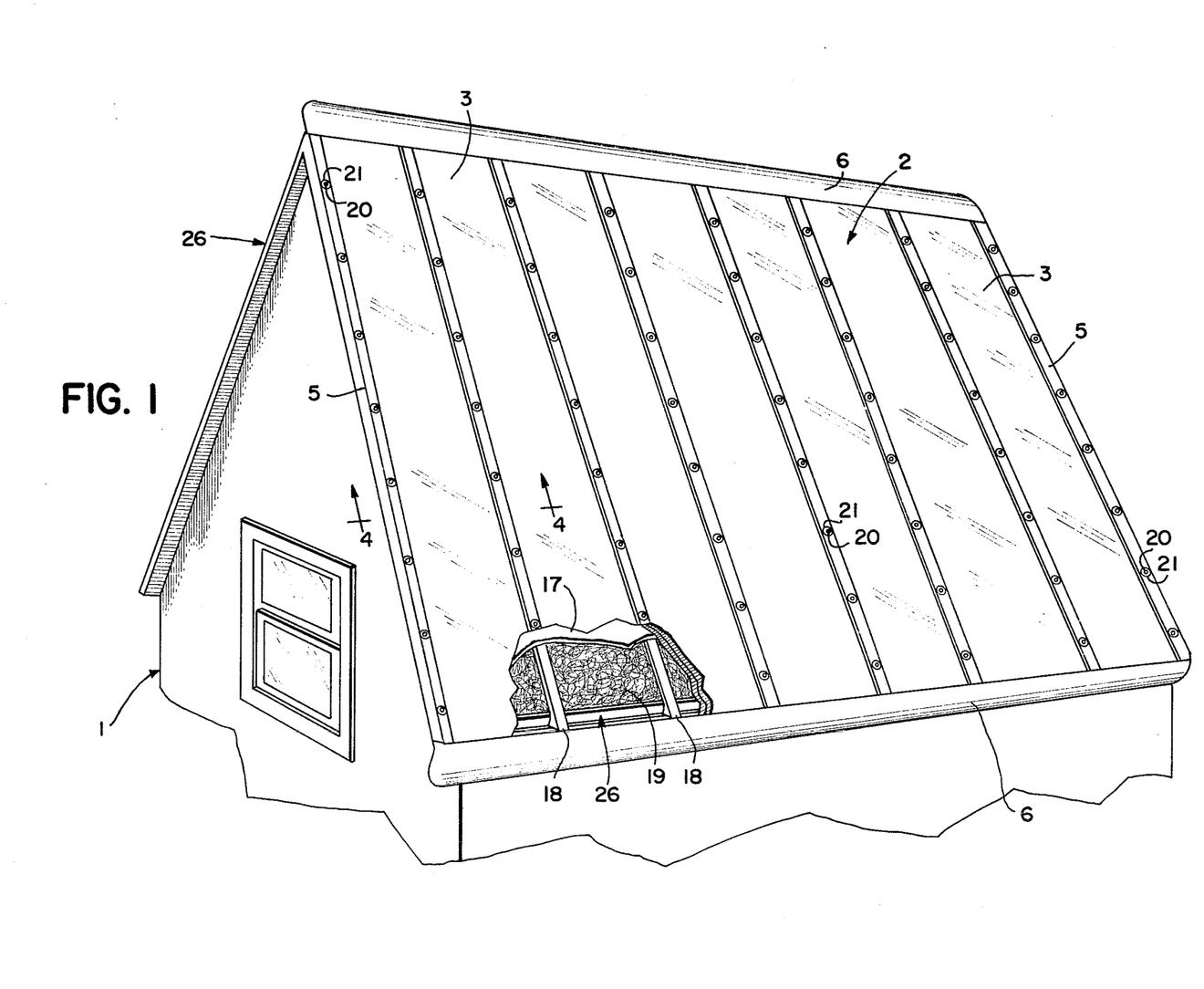
FIG. 1 is a perspective view of a building structure which has been provided with a solar thermal energy collection system comprising a plurality of improved solar collector panels which are in vertical, transverse alignment with the structure, and which is partially broken away to show interior construction details.

Referring now to the drawings, there is shown in FIG. 1 a building structure 1 which has been provided with a solar energy collector system 2. The solar energy collector system 2 comprises a plurality of flat plate-type solar collector panels 3 which are affixed to the structure 1 using a plurality of battens 4, 5, and a pair of headers 6 attached to the ends of the collector panels 3.

The solar collector panels 3 would be generally of the type disclosed in my patent application, Ser. No. 645,648; a unitary coextruded panel formed of synthetic theremoplastic, having a heat insulating region 7 and a heat absorbing region 8.

Each solar collector panel 3 is provided with a heat insulating region 7 and a heat absorbing region 8. The heat insulating region 7 would be transparent and thus capable of transmitting therethrough the major part of solar spectral radiation. The heat absorbing region 8 will be opaque, black or dark and thus capable of absorbing solar radiation passed through the heat insulating region 7.

Figure 3:
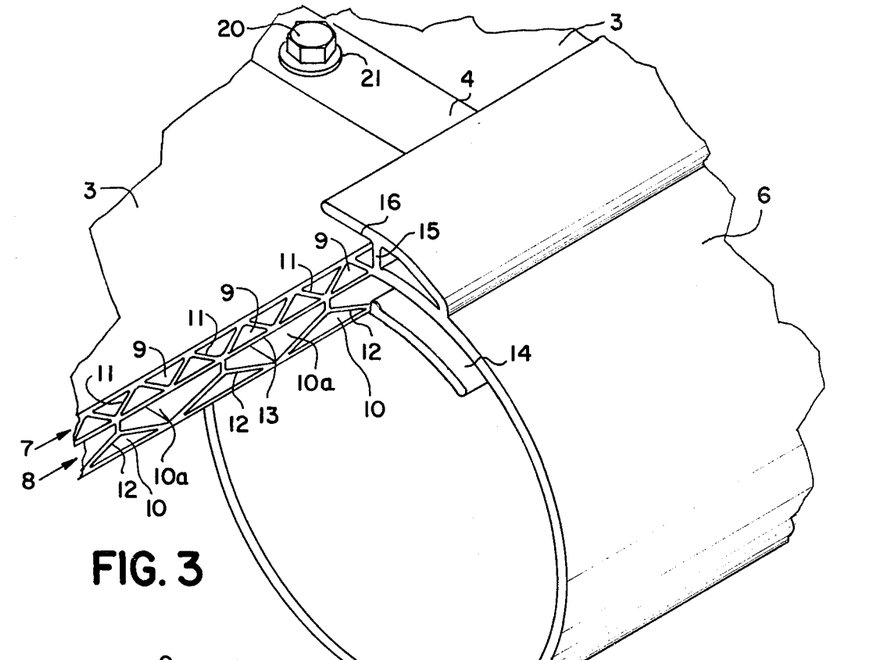
FIG. 3 is a partial, sectional view of the interface between the collector panels, the header and the means for affixing the collector panels to the structure of the building.

As illustrated in FIG. 3 each solar collector panel 3 is provided with a plurality of longitudinally extending channels 9, 10, 10a defined by ribs 11, 12. The heat insulating region 7 and the heat absorbing region 8 are separated from each other by a longitudinally extending divider 13. Various fluids may then be provided within the channels 9, 10, 10a to utilize the solar thermal energy absorbed by the collector panels 3. For example, the heat insulating region 7 would generally be provided with air. By sealing the ends of the channels 9 forming the heat insulating region 7 the air is prevented from circulating, thereby forming an insulating layer between the heat absorbing region 8 and the outside elements. The heat absorbing region 8 would generally be provided with a fluid such as air, a silicone fluid, water or a water-ethylene glycol mixture, which is then circulated through the channels 10, 10a of the heat absorbing region 8, thereby heating the fluid, which would then be carried away for use with the remainder of the system (not shown). Of course, it is to be understood that any one of several known fluids could be utilized in connection with either the heat insulating region 7 or the heat absorbing region 8 depending upon the particular application involved.

Each end of the solar collector panel 3 would be provided with a header 6 to permit connection of the collector panel 3 to the remainder of the heating system. The headers 6 are preferably manufactured in a manner similar to that of the collector panels 3, by extrusion of a synthetic thermoplastic. Extrusion permits formation of the headers 6 as long, unitary structures which may quickly and easily be attached to the collector panels 3 along the entire length of the interface between those elements.

As illustrated in FIG. 3 the header is preferably, essentially circular in cross-section, although headers of other shapes may also be produced, and is provided with an output channel 14, a fluid blocking portion 15 and a means for connecting the header 6 to the solar collector panel 3. The fluid blocking portion 15 is provided to prevent the fluid contained within the heat insulating region 7 from circulating, thus providing insulation between the heat absorbing region 8 and the outside elements. The output channel 14 is adapted to communicate with the channels 10, 10a of the heat absorbing region 8 in a manner which improves the uniformity of flow of the fluid as it flows between the collector panels 3 and the headers 6, thus improving the over-all efficiency of the system. As a means for connecting the header 6 to the solar panels 3, the header 6 is provided with upper and lower brackets 16 which are adapted to overfit the collector panels 3 either frictionally, by use of a suitable bonding agent, or by use of a suitable mechanical means, e.g. blind rivets. In this manner, the header 6 may be readily connected to one or more collector panels 3 as desired.

The solar collector panels 3 are affixed to the structure 1 using a plurality of battens, either battens 4 which are used to affix adjacent panels 3 to each other and to the structure 1, or end battens 5 used to affix the outer edges of the outermost panels 3 to the structure 1 and to seal the edges of the roof 26 of the structure 1 from the outside elements.

Figure 1A:
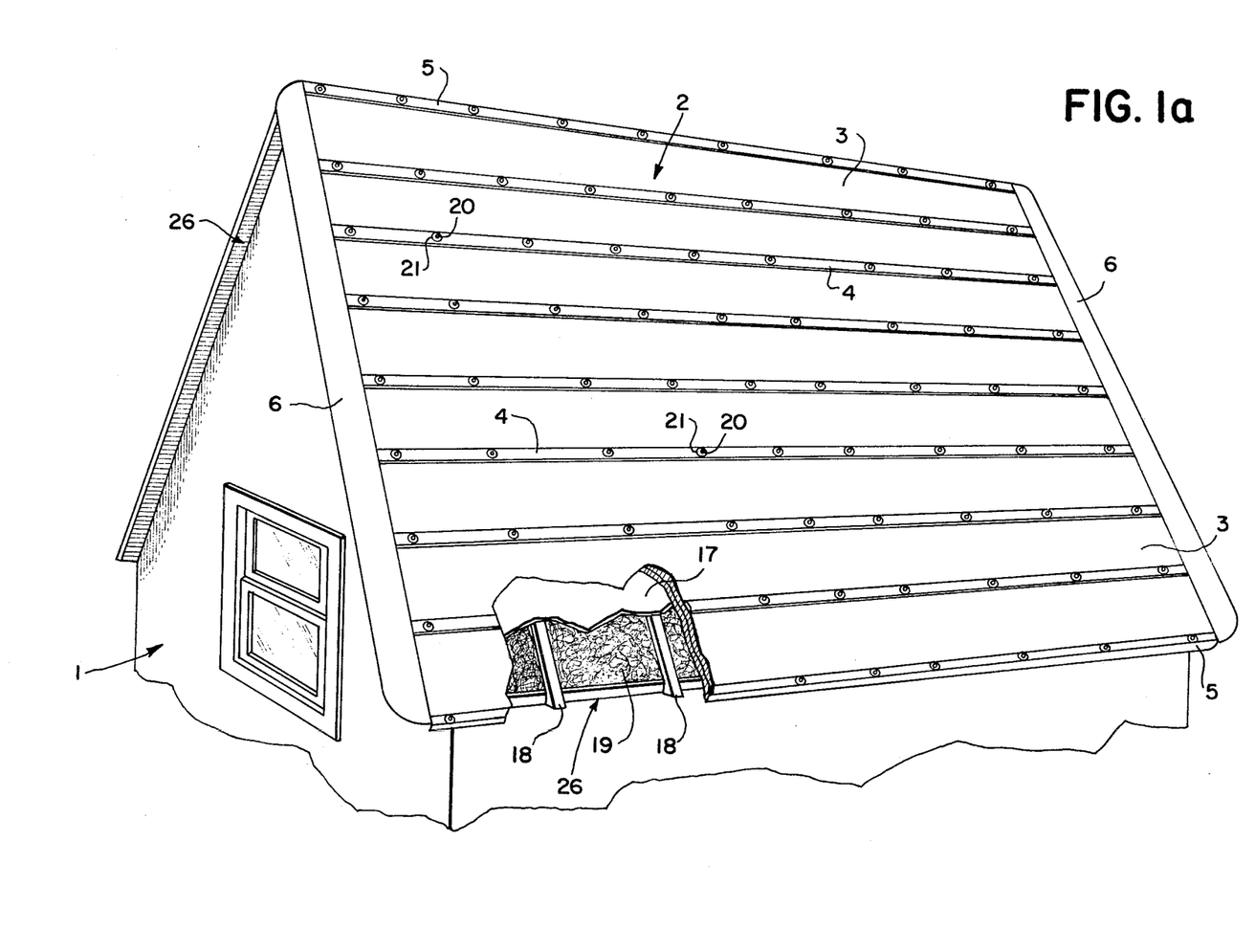
FIG. 1a is a perspective view of a building structure which has been provided with a solar thermal energy collection system comprising a plurality of improved solar collector panels which are in horizontal, longitudinal alignment with the structure, and which is partially broken away to show interior construction details.

The collector panels 3 illustrated in FIG. 1 are affixed to the roof 26 in a transverse orientation, the headers 6 extending along the top and bottom of the roof 26. However, as illustrated in FIG. 1a, it is equally possible to orient the collector panels 3 longitudinally, the headers 6 extending along the edges of the roof 26 rather than along its top and bottom. Transverse placement of the collector panels 3 on the roof 26 is preferred to reduce the potential for water to collect along the seams between the collector panels 3 and the battens 4, 5, and thus seep through the seams to the roof 26 below.

As illustrated in FIG. 1, the solar collector panels 3 are preferably applied to the structure 1 over a substrate 17 formed of plywood, or other sheet material, which may be conventionally applied to the rafters 18 of the roof 26 prior to installation of the collector panels 3. Insulation 19 may be applied beneath the substrate 17 and between the rafters 18 in known fashion. The solar collector panels 3 may then be placed over the substrate 17 in juxtaposed relationship and retained in place by the battens 4, 5, which are adapted to engage the collector panels 3 along their edges and retain them to the roof 26 of the structure 1. The battens 4, 5 may be attached to the substrate 17 and/or the rafters 18 using any of several fastening means, for example, nails, screws or the bolts 20 illustrated, placed at multiple locations along the battens 4, 5. Although not required, it is preferred that the fastening means be equally spaced along the battens 4, 5. The bolts 20 may be provided with flexible washers 21 in order to absorb some of the stress produced when the bolts 20 are tightened and to prevent water leakage or seepage around the bolts 20. In this manner the collector panels 3 are securely mounted to the roof 26 of the structure 1.

Each solar collector panel 3 would advantageously be on the order of 16 inches in width and would be of a length appropriate to cover the entire length or width of a structure (e.g. 15–20 feet). A width of 16 inches is advantageous in that many structures are provided with rafters 18 having 16 inch centers. Thus a collector panel 3 may be placed between and firmly attached to a pair of rafters 18. Of course, other widths are equally possible. Many homes presently have rafters 18 placed at 24 inch intervals. Collector panels having 24 inch widths would be appropriate in such cases. Although preferred, a one to one correspondence between rafter centers and collector panel width is not required, and collector panels 3 having any appropriate width may be utilized, if desired.

Collector panels 3 of the type above described are readily produced by the extrusion process, having widths preferably on the order of one to two feet. Such panels may be produced in long sections, the length generally being limited only by convenience and bulk. Fifteen foot sections have been found useful in many applications, however other lengths are clearly possible. Several such panels 3 may be laid adjacent to each other upon the roof 26 of the building structure 1, thereby enabling the complete coverage and usage of existing space.

After affixing the collector panels 3 to the roof 26 the headers 6 may be attached to the ends of the collector panels 3. The headers 6 may then be connected to the remainder of the circulatory system as desired. The above discussion illustrates the manner in which a plurality of solar collector panels 3 may be affixed to a structure 1 to combine to form a solar energy collection system 2. The collector panels 3 which combine to form such a system 2 will now be described in greater detail.

Figure 2:
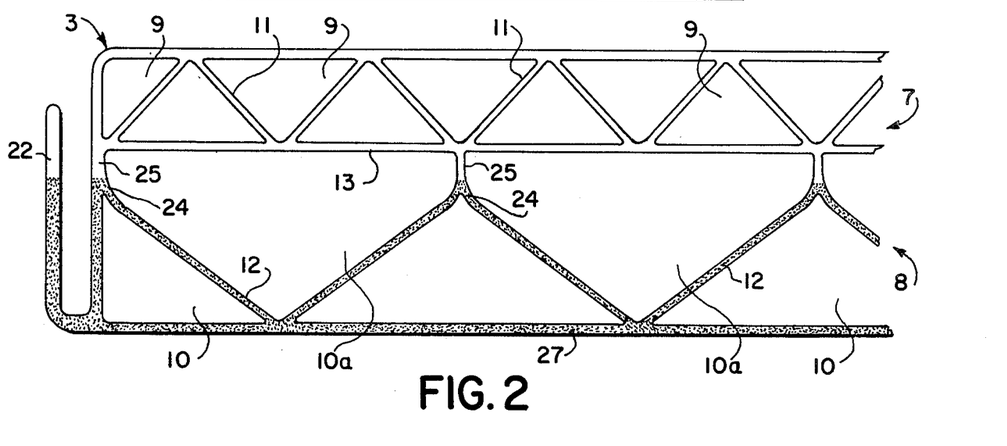
FIG. 2 is a partial, cross sectional view of the preferred embodiment of the improved unitary solar collector panel.

FIG. 2 illustrates the preferred embodiment of the solar collector panel 3. As illustrated, the collector panel 3 essentially comprises an upper, heat insulating region 7, and a lower, heat absorbing region 8, each of which is separated into a plurality of channels 9, 10, 10a adapted to accept fluids therein as will be further described below.

The collector panel 3 is particularly suitable for production as a unitary, coextruded panel, having no separate parts, which serves to solve many of the problems encountered with previous collector panels. Accordingly, the heat insulating region 7 and the heat absorbing region 8 may be formed as a unitary structure separated by an integrally formed divider 13.

To facilitate mounting the collector panel 3 to the building structure 1 an interlocking lip 22 may be provided as part of the collector panel 3. The interlocking lip 22 is particularly adapted for use with the battens 4, 5 serving to provide a secure means of mounting the collector panels 3 to the roof 26. The battens 4, 5 are provided with corresponding means for engaging the interlocking lip 22, forming an interlocking structure capable of providing adequate support for the collector panels 3. The interlocking lip 22 may advantageously be formed as an integral part of the collector panel 3, if desired.

The collector panels 3 are preferably constructed of a synthetic thermoplastic. Coextrusion of the panels 3 permits their formation using either the same or different materials for various sections of the collector panel 3, in particular the heat insulating region 7, and the heat absorbing region 8. The heat insulating region would preferably be formed of a material which is transparent or translucent in nature. The heat absorbing region 8 would generally be formed of a material which is opaque, dark or black in nature. Such a structure is well suited to the formation of long, lightweight, unitary collector panels thus providing a significant advance in the art.

Both the upper, heat insulating region 7, and the lower, heat absorbing region 8, are divided into a plurality of channels 9,10,10a, by ribs 11,12. The channels 9,10,10a extend longitudinally through the collector panel 3 serving to guide and direct the fluids contained therein through the collector panel 3 in a uniform flow, thus contributing to the efficiency of the system 2.

In my application, Ser. No. 645,648, the unitary collector panels disclosed were provided with ribs which preferably extended vertically, perpendicular to the base of the collector panel, such vertical ribs being used in both the heat insulating and heat absorbing region. Although such a configuration serves well in converting solar thermal energy into heat, it has since been determined that a certain degree of heat absorbed within the heat absorbing region was being lost as a result of convection currents which were present in the upper, heat insulating region of such panels. These currents are present even though the ends of the collector panels 3 are sealed by the fluid blocking portion 15 of the header 6. Thus it became desirable to reduce such losses by reducing the convection currents produced in the heat insulating region 7.

It has been determined that such currents could be appreciably reduced by increasing the frictional damping between these currents and the walls of the channels 9 of the heat insulating region 7. Such a result may be obtained by providing an increased number of channels 9 in the heat insulating region 7, thereby reducing the width and/or the cross sectional area of the channels 9, which increases the proportionate surface area of the walls contacted by a given current.

Figure 4:
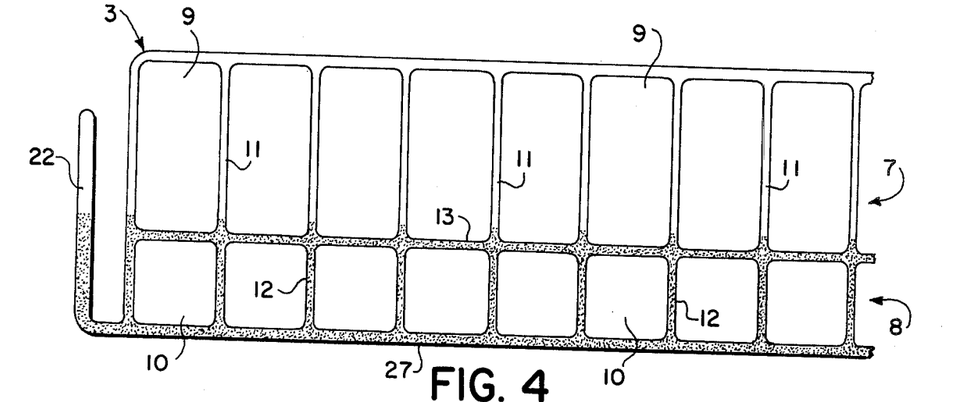
FIG. 4 is a partial, cross-sectional view of a first, alternative embodiment of the improved unitary solar collector panel.

FIG. 4 illustrates a first embodiment of a collector panel 3 capable of producing such a result. In FIG. 4 there is shown a collector panel 3 which resembles in many respects my earlier unitary collector panels. However, in this configuration there is one noteable distinction: an increased number of channels 9 are utilized per unit width in the upper, heat insulating region 7.

In my application, Ser. No. 645,648, there is shown in FIG. 2 a unitary collector panel having twice as many channels in the heat absorbing region as are provided in the heat insulating region. Although such a configuration provides excellent results, it has been found that a certain degree of heat loss is exhibited due to convection currents in the heat insulating region.

In accordance with the present invention, the collector panel 3 is provided with a number of heat insulating channels 9 at least equal to the number of channels 10 of the heat absorbing region 8. In so doing, the width of each channel 9 is decreased which increases frictional damping between the walls of the channels 9 and the currents circulating therein. In this manner heat loss due to convection is decreased.

FIG. 4 shows a collector panel 3, provided with a heat insulating region 7 and a heat absorbing region 8 having equal numbers of channels 9,10, which will exhibit the above described insulating effect.

Also to be noted in connection with the collector panel 3 of FIG. 4 is that, by decreasing the width of the channels 9, those channels 9 are now rectangular in form, having a height in excess of their width. Such a configuration serves to further increase collector efficiency by increasing the space provided for trapping heat absorbed by the collector panel 3, thereby reducing radiation losses from the heat insulating region. Although such a configuration is preferred, it is not required for proper execution of the foregoing inventive technique.

Figure 5:
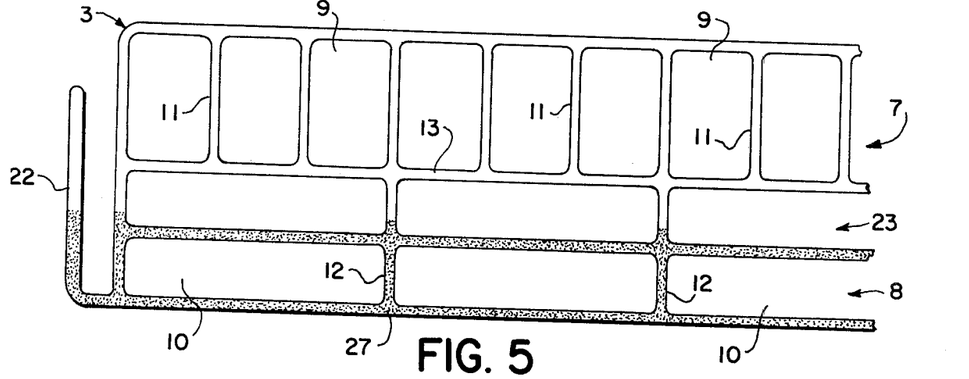
FIG. 5 is a partial, cross-sectional view of a second, alternative embodiment of the improved unitary solar collector panel.

The collector panel 3 illustrated therefore serves well to reduce convection currents within the channels 9 of the heat absorbing region 7. It is, of course, to be understood that many configuration are possible which are capable of producing similar results. For example, the insulating effect above described may be further improved upon by further increasing the number of channels 9 in the heat insulating region 7 with respect to those in the heat absorbing region 8. Increasing the number of channels 9 is readily accomplished by providing an additional number of ribs 11 per unit width during manufacture of the collector panel 3. FIG. 5 illustrates one such configuration, having three times as many channels 9 in its heat insulating region 7 as are found in its heat absorbing region 8. Other ratios are similarly possible.

The ribs 11 of the heat insulating region 7 and the ribs 12 of the heat absorbing region 8 are preferably formed in registration, as illustrated, to provide increased strength to the collector panel 3, however such registration is not required for satisfactory results to be obtained.

FIG. 2 illustrates another, preferred, configuration which may be used to decrease convection currents in the heat insulating region 7. In this configuration the ribs 11 are oblique, forming triangularly shaped channels 9 rather than the more conventional rectangular shape. The oblique ribs 11 serve to reduce the cross sectional area of the channels 9 which form the heat insulating region 7, thereby increasing the proportionate surface area contacted by the fluid circulated therein. Accordingly, as a result of frictional damping between the fluid and the walls of the channels 9, convection currents are decreased.

Utilizing oblique ribs 11 serves to provide yet additional improvements. For example, the collector panel 3 which results when oblique ribs 11 are used creates a heat insulating region 7 having essentially two sub-regions, one upon the other. In this manner those channels 9, the base of which face upwardly, act as a first insulating region, and those channels 9, having bases which face downwardly, act as a second insulating region between the outer, first region and the heat absorbing region 8. In this manner additional insulation is provided reducing heat losses to the elements.

Moreover, the triangular channels 9 not only serve to provide a heat insulating region 7 having two sub-regions, but they also permit the formation of such sub-regions in a collector panel 3 having essentially the same height as a collector panel 3 having only a single heat insulating region 7. Such a configuration is clearly advantageous for use in connection with a collector panel 3 which will be visible, as a physical part of a structure, where large, bulky collector panels 3 would be undesirable.

The above configurations therefore serve to significantly improve collector efficiency by reducing heat losses due to convection currents produced in the heat insulating region 7. By reducing heat lost to the elements it naturally follows that additional heat will be absorbed and retained witin the heat absorbing region 8, for subsequent use with the remainder of the system (not shown). Thus two further considerations directly follow: how to effectively transfer heat absorbed by the heat absorbing region 8 to the fluid circulating therethrough, and how to prevent the heat retained by the heat absorbing region 8 from causing the collector panel 3 to bow out of its normally planar configuration in a longitudinal concave fashion, in a loosely restrained system or free-standing position, during significant heat excursions encountered in use.

Turning first to the problem of bowing, it has been found that collector panels 3 of the type above described, in which the darkened, heat absorbing areas are placed along the base 27, have a certain tendency to bow out of their planar configuration when subjected to significant temperature excursions, often encountered in areas in which such panels could advantageously be used. Such bowing is clearly undesirable from both a functional and esthetic standpoint.

It has been determined that such bowing may be significantly reduced by modifying the point at which the greatest heat density occurs within the heat absorbing region 8. By moving this point of greatest heat density away from the base 27 of the collector panel 3 the expansion differential encountered between the upper, clear region 7 and the lower, darkened region 8 is reduced, despite the temperature differential between those areas. Since expansion occurs nearer the center of the collector panel 3 the bowing which resulted from the uneven expansion previously encountered is reduced.

FIG. 4 illustrates a first embodiment of a collector panel 3 capable of producing the above result. As previously mentioned, the collector panels 3 are well adapted for manufacture by coextrusion of one or more synthetic thermoplastics. During such manufacture the lower, heat absorbing region 8 is darkened using a suitable material, for example carbon black, to pigment the thermoplastic material used. By controlling the extent of the area of the collector panel 3 that is so darkened the point of greatest heat density may be readily moved to various points within the heat absorbing region 8 which are away from the base 27 of the collector panel 3. Thus, the collector panel 3 of FIG. 4 has been provided with a darkened area which surrounds the channels 10 of the heat absorbing region 8, extending through the divider 13 to a point just at the base of the heat insulating region 7. The point of greatest heat density would therefore occur just below the divider 13 rather than at the base 27 of the collector panel 3, as is preferred.

FIG. 5 illustrates an alternative embodiment of the collector panel 3 of FIG. 4. In this configuration, the collector panel 3 is provided with a third, intermediate region 23. The intermediate region 23 may be used to provide either additional heat insulation, as previously mentioned, or may be used to provide additional surface area for the transfer of heat absorbed by the collector panel 3 to the fluid circulated therethrough. For example, the intermediate region 23 illustrated is provided with a darkened portion which extends approximately half-way into the intermediate region 23. The intermediate region 23 would then be well suited for operation as a heat absorbing region, a suitable fluid being passed therethrough, for heat transfer to the remainder of the solar thermal energy collection system (not shown). Again the point of greatest heat density would be located away from the base 27, at a point near the top of the heat absorbing region 8.

In addition to reducing bowing, it may be seen that the collector panel 3 of FIG. 5 also serves to increase the transfer of heat absorbed by the collector panel 3 to the fluid circulated therethrough, thus addressing the second of the two considerations previously mentioned. By increasing the volume of fluid passed through the channels 10 of the heat absorbing region 8, heat transfer from the collector panels 3 to the remainder of the system is increased. Thus, the collector panel 3 of FIG. 5 is well suited to providing the three essential functions previously mentioned: reduced convection losses in the heat insulating region 7, increased heat transfer capabilities in the heat absorbing region 8, and reduced bowing.

Figure 6:
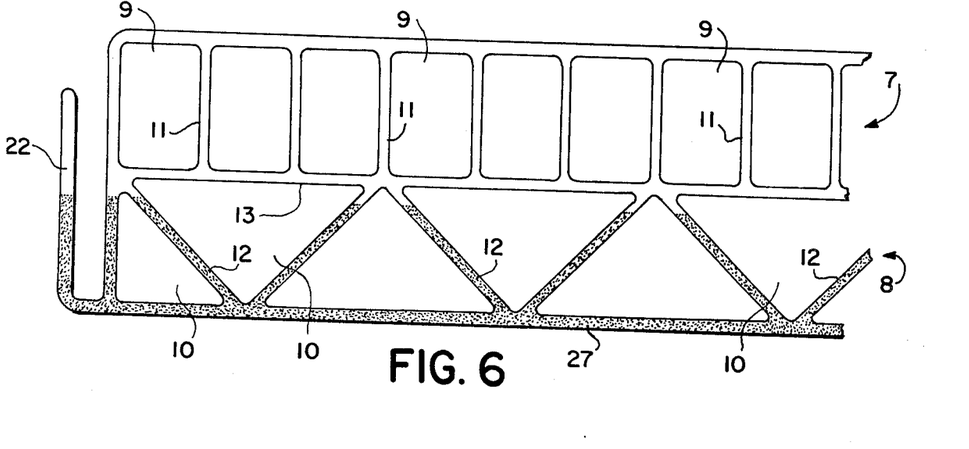
FIG. 6 is a partial, cross-sectional view of a third, alternative embodiment of the improved unitary solar collector panel.

FIG. 6 illustrates another embodiment of the collector panel 3, in this case providing still further improvements. The collector panel 3 of FIG. 6 is provided with a heat absorbing region 8 having oblique ribs 12 rather than the vertical ribs 12 illustrated in FIG. 5. In this manner, the heat absorbing region 8 is divided essentially into two sub-regions, each sub-region being defined by correspondingly oriented triangular channels 10. Such channels 10 provide all the advantages of the corresponding channels 10,23 of the collector panel of FIG. 5. Increased heat transfer is provided by having two heat absorbing regions, both of which serve to transfer heat to the fluid circulated therethrough. Bowing is reduced by appropriately darkening the oblique ribs 12 thereby moving the point of greatest heat density away from the base 27 of the collector panel 3. Reduced convection losses are provided by the heat insulating region 7 which is essentially the same as illustrated in FIG. 5.

In addition to providing all the advantages of the collector panel 3 of FIG. 5, the collector panel 3 of FIG. 6 also permits the construction of a collector panel 3 of lower profile, the triangular regions 10 combining to provide a double region in a space equivalent to that normally occupied by a single region.

FIG. 2 illustrates yet another, preferred, embodiment of the collector panel 3. The heat insulating region 7 is provided with oblique ribs 11 creating triangular channels 9. As previously mentioned such a configuration approximates a collector panel having two heat insulating regions, one on top of the other. Convection currents are correspondingly reduced, thereby reducing heat losses to the outside elements.

This triangular heat insulating region 7 is then used in connection with a modified, essentially triangular heat absorbing region 8, the heat absorbing region 8 being particularly well adapted to handle the increased heat provided by the improved heat insulating region 7 just described.

The heat absorbing region 8 is provided with oblique ribs 12 which extend upwardly, terminating at a linear extension 25. The oblique ribs 12 can either directly meet the linear extension 25, or may be separated from the linear extension 25 by a curved section 24 as is illustrated in FIG. 2. In this manner, the heat absorbing region 8 is divided into two groups of channels, one group of channels 10a being larger in cross sectional area than the other group of channels 10.

Further, the enlarged channels 10a are darkened, preferably as illustrated (along the entire length of the ribs 12 and the curved section 24, to a point along the linear extension 25). In this manner the point of greatest heat density is moved away from the base 27 of the collector panel 3 thereby serving to reduce the potential for bowing.

Moving the darkened portions of the heat absorbing region 8 to a point away from the base 27 divides the heat absorbing region 8 into two regions, one above the heated surface, which is exposed to the sun, and one below the surface, which is not. It has been found that a greater temperature is exhibited in those regions which are directly exposed to the sun, hence the channels 10a.

The channels 10,10a are configured to take advantage of this effect; the larger, exposed channels 10a being placed over the smaller, covered channels 10. In this manner greater volumetric flow is accommodated through the channels 10a, improving heat transfer from the warmer portions of the heat absorbing region 8 to the fluid circulating therein. Moreover, by increasing heat transfer to the fluid, the temperature of the region defined by the channels 10a, which is higher than that of the channels 10, is reduced to a point approaching the temperature of the smaller channels 10. Ideally, the temperatures of the fluids exiting the channels 10,10a are the same, providing a uniform fluid distribution into the header 6. Varying the size of the channels 10,10a permits regulation of this balance. Temperature mismatch between the channels 10,10a tends to cause radiation losses, due to heat being trapped within the channels 10,10a. These losses may be reduced by properly balancing the size of the channels 10,10a.

Thus the collector panel 3 of FIG. 2 provides all the advantages of a four tiered collector panel, two tiers being used in both the heat insulating region 7 and the heat absorbing region 8. However, as a result of the oblique configuration of the ribs 11,12 this structure is provided in a collector panel 3 having outer dimensions equivalent to those of a panel having only two tiers, providing a significantly improved collector panel 3. The resulting collector panel 3 has a mass equivalent to that of a two tiered collector panel, reducing the mass of the resulting panel below that which an equivalent four tiered panel would ordinarily exhibit.

As may be seen from the above discussion, an improved collector panel may be constructed which is capable of reducing convective heat losses from the heat insulating region 7, increasing effective heat transfer from the heat absorbing region 8 to the fluid circulated therethrough, and reducing bowing. Several embodiments of such a collector panel have been illustrated. Clearly, other similarly effective embodiments are possible, by combining features of the several panels disclosed, and by further varying the size, number, and inclination of the ribs 11,12 which form the channels 9,10,10a of the collector panel 3. For example, the channels 9,10,10a that result when oblique ribs are utilized need not be triangular. Other polygonal, or curved shapes may result as the length, curvature, and inclination of the ribs 11,12 are varied.

Figure 7:
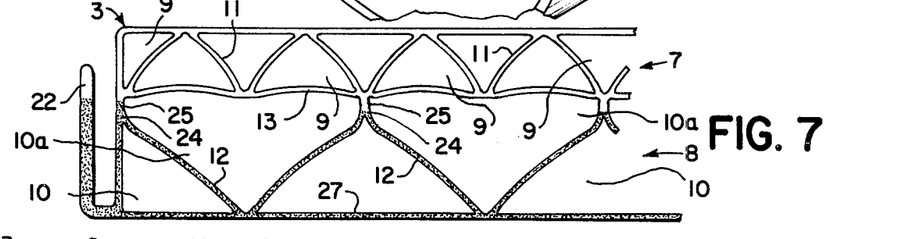
FIG. 7 is a partial, cross-sectional view of the improved unitary solar collector panel of FIG. 2 having curved ribs in the heat absorbing the heat insulating region.

FIG. 7 is illustrative of one such collector panel 3, having curved ribs 11,12 in both the heat insulation region 7 and the heat absorbing region 8, and a curved divider 13. Curving the ribs 11,12 and divider 13 as shown serves to increase contact between the walls of the uppermost channels 9 of the heat insulating region 7 and the fluid circulating therethrough, thereby decreasing convection losses by increasing frictional damping near the collector panel surface. Moreover, the cross sectional area of the channels 10a is increased, allowing increased volumetric flow through the channels 10a and therefore increasing heat transfer from the heat absorbing region 8 to the remainder of the system 2. Accordingly, as illustrated, a curvature of the ribs 11,12 in a convex fashion with respect to the base 27 of the collector panel 3 is preferred. However, a concave curvature is also possible, as is utilization of curved ribs in only the heat insulating region 7 or the heat absorbing region 8, if desired.

Moreover, although the above improvements have been discussed in connection with a unitary type solar collector panel, it is equally possible to utilize similar improvements in connection with other, conventional collector panels, for example modular solar panels or solar panels which are constructed from a plurality of separate components, whether formed of plastic, glass or some other combination of materials.

It may therefore be seen that the above disclosed invention serves well to accomplish the objects previously stated. It may also be seen that the above described invention may be embodied in other specific forms in addition to those above disclosed and therefore the disclosure made should be interpreted in an illustrative and not a limiting sense.

I claim:

1. In a unitary, coextruded solar collector panel of the type having a first heat insulation region, divided into a plurality of first channels by a plurality of first ribs extending from the top of the heat insulation region to the bottom thereof, and a second, heat absorbing region, divided into a plurality of second channels by a plurality of second ribs extending from the top of the heat absorbing region to the bottom thereof, wherein the second region is adapted to absorb heat produced by solar radiation impinging thereupon, and the first region is adapted to insulate the second region to prevent the heat absorbed by the second region from being lost to the external elements, an improved collector panel which comprises:

a heat insulating region having at least as many first channels as their are second channels in the heat absorbing region, whereby convection currents which occur within the first channels are reduced, thereby reducing the heat losses so created; and wherein the second ribs extend along substantially the entire length of the heat absorbing region and are obliquely oriented to separate the second channels into two groups of polygonal channels that intermesh for enhancing heat transfer, the ends of said second ribs lying in substantially the same plane.

2. The collector panel of claim 1 which has a greater number of first channels in the heat insulating region than the number of second channels in the heat absorbing region.

3. The collector panel of claim 1 wherein the height of the first channels is greater than their width.

4. The collector panel of claim 1 wherein the first channels are rectangular.

5. The collector panel of claim 4 wherein portions of the walls of the second channels are darkened.

6. The collector panel of claim 1 wherein the obliquely oriented ribs combine to form triangular channels.

7. The collector panel of claim 6 wherein the obliquely oriented ribs combine to form two groups of triangular channels, which intermesh, the bases of the triangular channels of one group being substantially parallel to a line joining the apexes of the triangular channels of the other group.

8. In a unitary, coextruded solar collector panel of the type having a first heat insulation region, divided into a plurality of first channels by a plurality of first ribs extending from the top of the heat insulation region to the bottom thereof, and a second, heat absorbing region, divided into a plurality of second channels by a plurality of second ribs extending from the top of the heat absorbing region to the bottom thereof, wherein the second region is adapted to absorb heat produced by solar radiation impinging thereupon, and the first region is adapted to insulate the second region to prevent the heat absorbed by the second region from being lost to the external elements, an improved collector panel which comprises:

a heat insulating region having at least as many first channels as there are second channels in the heat absorbing region, said first ribs being obliquely oriented to divide the first channels into two groups of intermeshing polygonal channels whereby convection currents which occur within the first channels are reduced, thereby reducing the heat losses so created; and wherein the second ribs extend along substantially the entire length of the heat absorbing region, the ends of such second ribs lying in substantially the same plane.

9. The collector panel of claim 8 wherein the obliquely oriented ribs combine to form triangular channels.

10. The collector panel of claim 9 wherein the obliquely oriented ribs combine to form two groups of triangular channels, which intermesh, the bases of the triangular channels of one group being substantially parallel to a line joining the apexes of the triangular channels of the other group.

11. The collector panel of claim 8 wherein the first channels are capable of passing solar radiation therethrough.

12. The collector panel of claim 11 wherein the first channels are clear.

13. The collector panel of claim 8 wherein the second channels are partitioned by a plurality of obliquely oriented ribs to divide said second channels into two groups of polygonal channels that intermesh for enhancing heat transfer.

14. In a unitary, coextruded solar collector panel of the type having a first heat insulation region, divided into a plurality of first channels by a plurality of first ribs extending from the top of the heat insulation region to the bottom thereof, and a second, heat absorbing region, divided into a plurality of second channels by a plurality of second ribs extending from the top of the heat absorbing region to the bottom thereof, wherein the second region is adapted to absorb heat produced by solar radiation impinging thereupon, and the first region is adapted to insulate the second region to prevent the heat absorbed by the second region from being lost to the external elements, an improved collector panel which comprises:

a heat insulating region having at least as many first channels as their are second channels in the heat absorbing region, said first channels being partitioned by a plurality of oblique ribs; whereby convection currents which occur within the first channels are reduced, thereby reducing the heat losses so created;

said second channels being partitioned by a plurality of obliquely oriented ribs, said obliquely oriented ribs that partition the second channels being connected, at their uppermost end, to the lower end of a substantially vertical portion, the upper end of which is connected to the upper wall of the second channels.

15. The collector panel of claim 14 wherein the vertical portion is linear.

16. The collector panel of claim 14 wherein the vertical portion is perpendicular to the upper wall of the second channels.

17. The collector panel of claim 14 wherein the obliquely oriented ribs combine to form two groups of second channels, one group having a cross sectional area greater than that of the other group.

18. The collector panel of claim 17 wherein the group of channels having the greater cross sectional area is located at a point substantially raised from the group of channels having the smaller cross sectional area.

19. The collector panel of claim 17 wherein the group of second channels having the smaller cross sectional area are essentially triangular.

20. The collector panel of claim 19 wherein the bases of the triangular group of second channels correspond to the base of the heat absorbing region.

21. The collector panel of claim 14 wherein portions of the heat absorbing region are darkened.

22. The collector panel of claim 21 wherein the darkened portions of the heat absorbing region include portions of the obliquely oriented ribs.

23. In a unitary, coextruded solar collector panel of the type having a first heat insulation region, divided into a plurality of first channels by a plurality of first ribs extending from the top of the heat insulation region to the bottom thereof, and a second, heat absorbing region, divided into a plurality of second channels by a plurality of second ribs extending from the top of the heat absorbing region to the bottom thereof, wherein the second region is adapted to absorb heat produced by solar radiation impinging thereupon, and the first region is adapted to insulate the second region to prevent the heat absorbed by the second region from being lost to the external elements, an improved collector panel which comprises:
a heat insulating region having at least as many first channels as their are second channels in the heat absorbing region, whereby convection currents which occur within the first channels are reduced, thereby reducing the heat losses so created;
said second channels being partitioned by a plurality of oblique ribs, said oblique ribs being connected, at their uppermost end, to the lower end of a substantially vertical portion, the upper end of which is connected to the upper wall of the second channels.

24. The collector panel of claim 23 wherein the vertical portion is linear.

25. The collector panel of claim 23 wherein the vertical portion is perpendicular to the upper wall of the second channels.

26. The collector panel of claim 23 wherein the obliquely oriented ribs combine to form two groups of second channels, one group having a cross sectional area greater than that of the other group.

27. The collector panel of claim 26 wherein the group of channels having the greater cross sectional area is located at a point substantially raised from the group of channels having the smaller cross sectional area.

28. The collector panel of claim 26 wherein the group of second channels having the smaller cross sectional area are essentially triangular.

29. The collector panel of claim 28 wherein the bases of the triangular group of second channels correspond to the base of the heat absorbing region.

30. The collector panel of claim 23 wherein portions of the heat absorbing region are darkened.

31. The collector panel of claim 5, 21 or 30 wherein the darkened portions are positioned such that the point of greatest heat density is at a point away from the base of the heat absorbing region.

32. The collector panel of claim 5, 21 or 30 wherein the darkened portions are black.

33. The collector panel of claim 1, 7, 13, 14 or 23 wherein portions of the ribs are curved.

34. The collector panel of claim 33 wherein portions of the wall separating the first channels from the second channels is also curved.

35. The collector panel of claim 33 wherein the curvature of the ribs is convex with respect to the base of the collector panel.

36. In a unitary, coextruded solar collector panel of the type having a first, heat insulating region, divided into a plurality of first channels by a plurality of first ribs extending from the top of the heat insulating region to the bottom thereof, and a second, heat absorbing region, divided into a plurality of second channels by a plurality of second ribs extending from the top of the heat absorbing region to the bottom thereof, wherein the second region is adapted to absorb heat produced by solar radiation impinging thereupon, and the first region is adapted to insulate the second region to prevent the heat absorbed by the second region from being lost to the external elements, an improved collector panel which comprises:
a heat absorbing region having second ribs, portions of which are darkened, the darkened portions of the ribs being positioned so that the point of greatest heat density is at a point away from the base of the collector panel,
thereby reducing bowing of the collector panel out of its normally planar configuration, in either a concave or convex manner.

37. The collector panel of claim 36 wherein portions of the base are also darkened.

38. The collector panel of claim 36 wherein portions of the upper wall of the second channels are also darkened.

39. The collector panel of claim 36 wherein the darkened portions completely surround the second channels.

40. In a unitary, coextruded solar collector panel of the type having a first heat insulation region, divided into a plurality of first channels by a plurality of first ribs extending from the top of the heat insulation region to the bottom thereof, and a second, heat absorbing region, divided into a plurality of second channels by a plurality of second ribs extending from the top of the heat absorbing region to the bottom thereof, wherein the second region is adapted to absorb heat produced by solar radiation impinging thereupon, and the first region is adapted to insulate the second region to prevent the heat absorbed by the second region from being lost to the external elements, an improved collector panel which comprises:
a heat insulating region having at least as many first channels as their are second channels in the heat absorbing region, whereby convection currents which occur within the first channels are reduced, thereby reducing the heat losses so created;
said second ribs extending along substantially the entire length of the heat absorbing region, the ends of such second ribs lying in substantially the same plane, portions of the walls defining the second channels being darkened, said darkened portions being positioned such that the point of greatest heat density is at a point away from the base of the heat absorbing region.

* * * * *